US012574074B2

(12) United States Patent (10) Patent No.: US 12,574,074 B2
Oh et al. (45) Date of Patent: Mar. 10, 2026

(54) RECONFIGURABLE INTELLIGENT SURFACE INCLUDING MULTIPLE UNIT CELLS

(71) Applicant: Samsung Electronics Co., Ltd., Gyeonggi-do (KR)

(72) Inventors: Junhwa Oh, Gyeonggi-do (KR); Yuntae Park, Gyeonggi-do (KR); Sanghyuk Wi, Gyeonggi-do (KR); Jungi Jeong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 327 days.

(21) Appl. No.: 18/536,940

(22) Filed: Dec. 12, 2023

(65) Prior Publication Data

US 2024/0195458 A1 Jun. 13, 2024

(30) Foreign Application Priority Data

Dec. 12, 2022 (KR) ........................ 10-2022-0172841

(51) Int. Cl.
H04B 7/04 (2017.01)
(52) U.S. Cl.
CPC ................................ H04B 7/04013 (2023.05)
(58) Field of Classification Search
CPC .............................. H04B 7/00; H04B 7/04013
See application file for complete search history.

(56) References Cited

U.S. PATENT DOCUMENTS

2013/0229296 A1    9/2013  Maruyama et al.
2015/0189461 A1*   7/2015  Pang ..................... H04W 76/14
                                                455/41.1

2017/0062945 A1    3/2017  Foo
2019/0288403 A1    9/2019  Clemente
2021/0050671 A1    2/2021  Stevenson et al.
2022/0052764 A1*   2/2022  Medra .................. H04B 10/614

(Continued)

FOREIGN PATENT DOCUMENTS

CN          111912409          11/2020
CN          114039706           2/2022

(Continued)

OTHER PUBLICATIONS

Ying She et al., "Intelligent Reconfigurable Metasurface for Self-Adaptively Electromagnetic Functionality Switching", Photonics Research, vol. 10, No. 3, Mar. 2022, 9 pages.

(Continued)

*Primary Examiner* — Raymond S Dean
(74) *Attorney, Agent, or Firm* — The Farrell Law Firm, P.C.

(57) ABSTRACT

A 5G communication system or a 6G communication system for supporting higher data rates beyond a 4G communication system such as long term evolution (LTE). A reconfigurable intelligent surface (RIS) including a plurality of unit cells in a wireless communication system includes a first pattern included in a top layer of a unit cell included in the RIS, a second pattern included in a bottom layer of the unit cell included in the RIS, and at least one switch configured to electrically ground or short the first pattern and the second pattern in response to a command for determining whether the unit cell included in the RIS operates as a transmissive RIS or a reflective RIS.

17 Claims, 18 Drawing Sheets

(56) References Cited

U.S. PATENT DOCUMENTS

| | | | | |
|---|---|---|---|---|
| 2022/0059943 A1* | 2/2022 | Saab | .................... | H04B 7/0617 |
| 2022/0109492 A1* | 4/2022 | Abedini | ............... | H04B 7/0639 |
| 2022/0247480 A1 | 8/2022 | Papadopoulos | | |
| 2024/0090050 A1 | 3/2024 | Fujishiro et al. | | |
| 2025/0125525 A1* | 4/2025 | Rossanese | ........... | H04B 7/0617 |
| 2025/0273855 A1* | 8/2025 | Anim | ................. | H04B 7/04013 |

FOREIGN PATENT DOCUMENTS

| | | |
|---|---|---|
| CN | 114124172 | 3/2022 |
| KR | 10-2022-0044342 | 4/2022 |
| KR | 1020220067452 | 5/2022 |
| WO | WO 2022/249821 | 12/2022 |

OTHER PUBLICATIONS

International Search Report dated Mar. 28, 2024 issued in counterpart application No. PCT/KR2023/020225, 7 pages.

Bao, Lei et al., "Programmable Reflection-Transmission Shared-Aperture Metasurface for Real-Time Control of Electromagnetic Waves in Full Space", Aug. 2021.

Tao, Zui et al., "Reconfigurable conversions of reflection, transmission, and polarization states using active metasurface", Appl. Phys. Lett. 110, 121901 (2017), https://doi.org/10.1063/1.4979033, Submitted: Dec. 15, 2016, Accepted: Mar. 8, 2017, Published Online: Mar. 20, 2017, pp. 6.

Wang, Ling et al., "Reconfigurable Multifunctional Metasurface Hybridized with Vanadium Dioxide at Terahertz Frequencies", Nov. 2018.

Liu, Yuanwei et al., "STAR: Simultaneous Transmission and Reflection for 360° Coverage by Intelligent Surfaces", arXiv:2103. 09104v2 [cs.IT] Mar. 17, 2021, pp. 15.

* cited by examiner

Incident wave

Transmitted wave

Reflected wave

1220

Transmissive/reflective RIS

Top-view

1210

Base station1

1212    1230

Base station2

UE1

1220

UE2    1240

1214

Base station3

Reflective area

Transmissive area

RECONFIGURABLE INTELLIGENT SURFACE INCLUDING MULTIPLE UNIT CELLS

CROSS-REFERENCE TO RELATED APPLICATION(S)

This application is based on and claims priority under 35 U.S.C. § 119 to Korean Patent Application No. 10-2022-0172841, which was filed in the Korean Intellectual Property Office on Dec. 12, 2022, the entire disclosure of which is incorporated herein by reference.

BACKGROUND

1. Field

This disclosure relates to a reconfigurable intelligent surface (RIS) including a plurality of unit cells applicable to ultra-high frequency systems.

2. Description of the Related Art

Considering the development of wireless communication from generation to generation, the technologies have been developed mainly for services targeting humans, such as voice calls, multimedia services, and data services. Following the commercialization of 5G (5th-generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality (AR) glasses, virtual reality (VR) headsets, and hologram devices. In order to provide various services by connecting hundreds of billions of devices and things in the 6G (6th-generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to a more severe path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; use of artificial intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

Meanwhile, RIS technology is being researched as one of the next-generation communication technologies. In RIS technology, a reflection pattern of reflecting elements (REs) included in the RIS device is formed as a combination of phase and/or amplitude, and the transmission beam of the base station incident on the RIS device may be reflected in a desired direction according to the reflection pattern. It is possible to transfer the transmission beam incident on the RIS device to the UE located in a shadow area where the transmission beam cannot reach from the base station by reflecting the transmission beam.

There is increasing need for the reflective RIS and the transmissive RIS to be used selectively or in combination according to various communication environments and difference in the structure of the RIS unit cell depending on the operation of the reflective RIS and the transmissive RIS.

SUMMARY

According to an embodiment, a reconfigurable intelligent surface (RIS) including a plurality of unit cells in a wireless communication system includes a first pattern included in a top layer of a unit cell included in the RIS, a second pattern included in a bottom layer of the unit cell included in the RIS, and at least one switch configured to electrically ground or short the first pattern and the second pattern in response to a command for determining whether the unit cell included in the RIS operates as a transmissive RIS or a reflective RIS.

According to an embodiment, a reconfigurable intelligent surface (RIS) controller controlling an RIS including a plurality of unit cells in a wireless communication system includes a transceiver and a controller. The controller receives, from a base station, a message for determining whether a unit cell included in the RIS operates as a transmissive RIS or a reflective RIS. The controller transmits, to the RIS, a command for controlling at least one switch included in the RIS to electrically ground or short a first pattern included in the RIS and a second pattern included in the RIS based on the message.

The RIS according to an embodiment may operate as a reflective RIS or a transmissive RIS through one structure, thereby enhancing signal transmission/reception efficiency using the RIS in various communication environments.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1A:
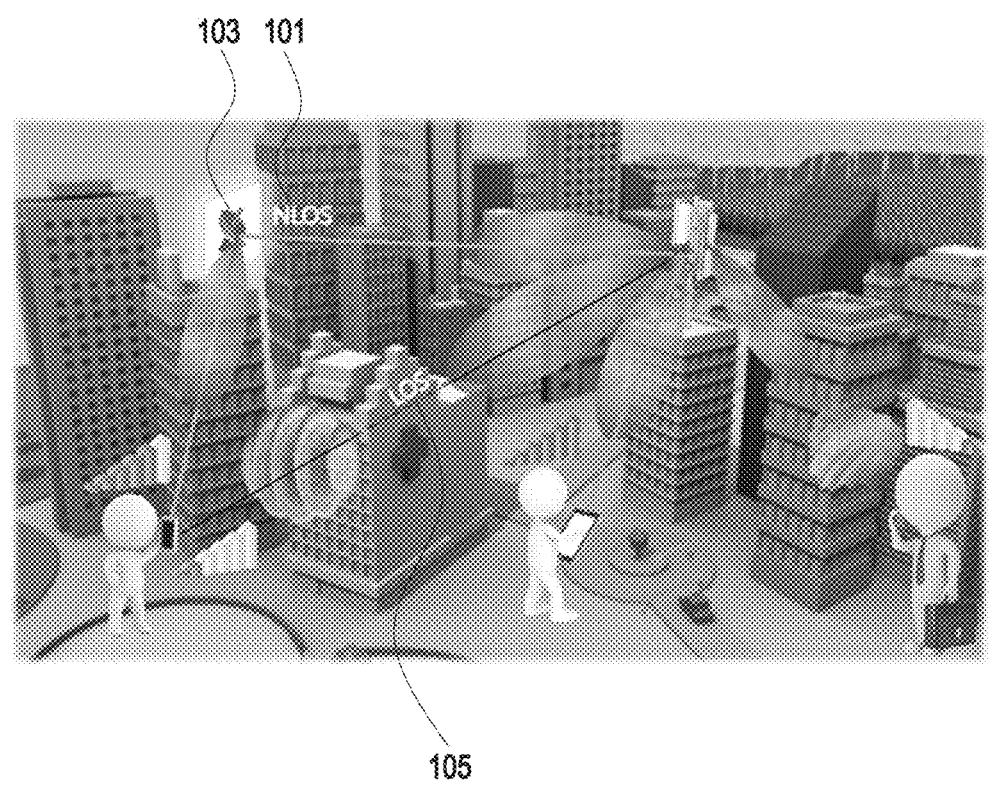
FIGS. 1A and 1B illustrate operations of a reflective RIS, according to an embodiment.

Hereinafter, embodiments of the disclosure are described in detail with reference to the accompanying drawings. The same reference numerals may be used to refer to the same or similar elements throughout the specification and the drawings. When making the gist of the disclosure unclear, the detailed description of known functions or configurations is skipped.

In describing the embodiments of the disclosure, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, a 'unit' is not limited to software or hardware. A "unit" may be configured in a storage medium that may be addressed or may be configured to execute one or more processors. Accordingly, as an example, a "unit" includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the "units" may be combined into smaller numbers of components and "units" or further separated into additional components and 'units'. Further, the components and "units" may be implemented to execute one or more central processing units (CPUs) in a device or secure multimedia card.

According to an embodiment, the base station (BS) may be an entity allocating resources to terminals and may be at least one of gNode B, gNB, eNode B, eNB, Node B, wireless access unit, base station controller, or node over network. The base station may be a network entity including at least one of an integrated access and backhaul-donor (IAB-donor), which is a gNB providing network access to user equipment(s) (UE(s)) through a network of backhaul and access links in the new radio (NR) system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

Further, the terminal may include a UE, a mobile station (MS), a cellular phone, a smart phone, a computer, or various devices capable of performing a communication function. In the disclosure, downlink (DL) refers to a wireless transmission path of signal transmitted from the base station to the terminal, and uplink (UL) refers to a wireless transmission path of signal transmitted from the terminal to the base station. Although the long term evolution (LTE) or LTE-Advanced (LTE-A) systems may be described below as an example, embodiments of the disclosure may be applied to other communication systems having a similar technical background or channel shape. For example, 5G mobile communication technology (5G, NR) developed after LTE-A may be included therein, and 5G below may be a concept including legacy LTE, LTE-A and other similar services. Further, the embodiments may be modified in such a range as not to significantly depart from the scope of the disclosure under the determination by one of ordinary skill in the art and such modifications may be applicable to other communication systems.

As used herein, terms denoting signals, terms denoting channels, terms denoting control information, terms denoting network entities, and terms denoting device components are provided as an example for ease of description. As used herein, terms for identifying nodes, terms denoting messages, terms denoting inter-network entity interfaces, and terms denoting various pieces of identification information are provided as an example for ease of description. The disclosure is not limited to these terms, and other terms equivalent in technical concept may also be used.

Further, although the disclosure describes various embodiments using terms used in some communication standards (e.g., 3rd generation partnership project (3GPP)), this is merely an example for description. Various embodiments of the disclosure may be easily modified and applied in other communication systems.

Figure 1B:
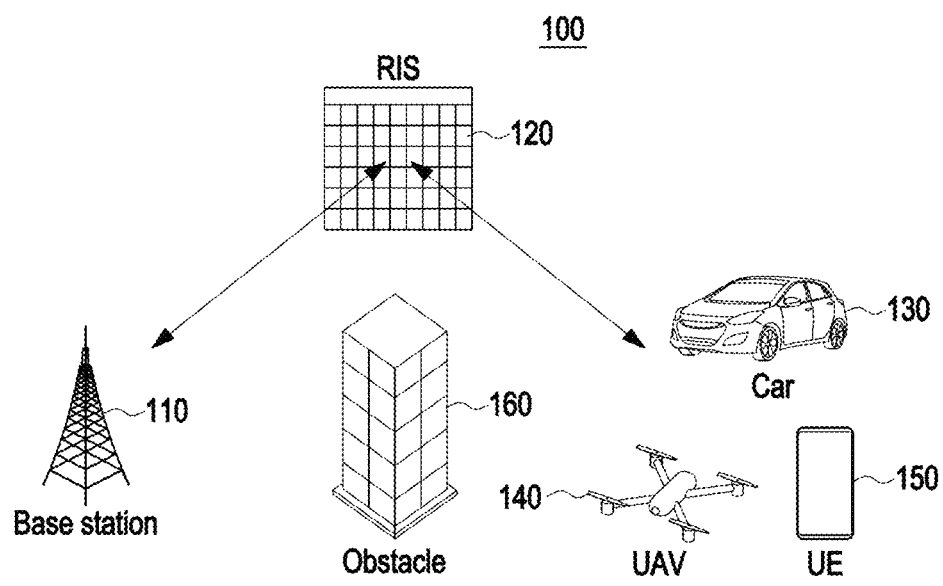

FIGS. 1A and 1B illustrate operations of a reflective RIS, according to an embodiment.

A line of sight (LOS) signal refers to a straight wave or a direct wave, and means a wave that directly arrives from the transmission point to the reception point without diffraction or reflection. The LOS signal may be a straight wave or a direct wave within a field of view, i.e., at a visible distance. A non-line of sight (NLOS) signal may refer to a non-straight wave or a non-direct wave, and may mean a signal diffracted or reflected by an obstacle and propagated.

Referring to FIG. 1A, the NLOS signal 101 may be transferred to the reception point after being reflected through the object 103, and the LOS signal 105 may be transferred directly to the user without reflection or diffraction.

The object 103 may be implemented as a reconfigurable intelligent surface (RIS). The object 103 may be used to enhance reception performance of the UE within coverage.

Referring to FIG. 1B, a system 100 may include a base station 110, an RIS 120, an electronic device (at least one of 130 to 150), and an obstacle 160. The electronic device may include at least one of a car 130, an unmanned aerial vehicle (UAV) 140, and a UE 150.

When there is an obstacle 160 that prevents the transmission/reception signal from going straight during wireless communication between the base station 110 and the electronic device (at least one of 130 to 150), the base station 110 and the electronic device may reflect the transmission/reception signal through the RIS 120 to exchange signals. In an environment in which it is difficult to directly transfer a transmission/reception signal between the base station 110 and the electronic device due to the obstacle 160, the RIS 120 may enhance reception performance of the base station 110 and the electronic device by reflecting and transferring the transmission/reception signal.

Figure 2A:
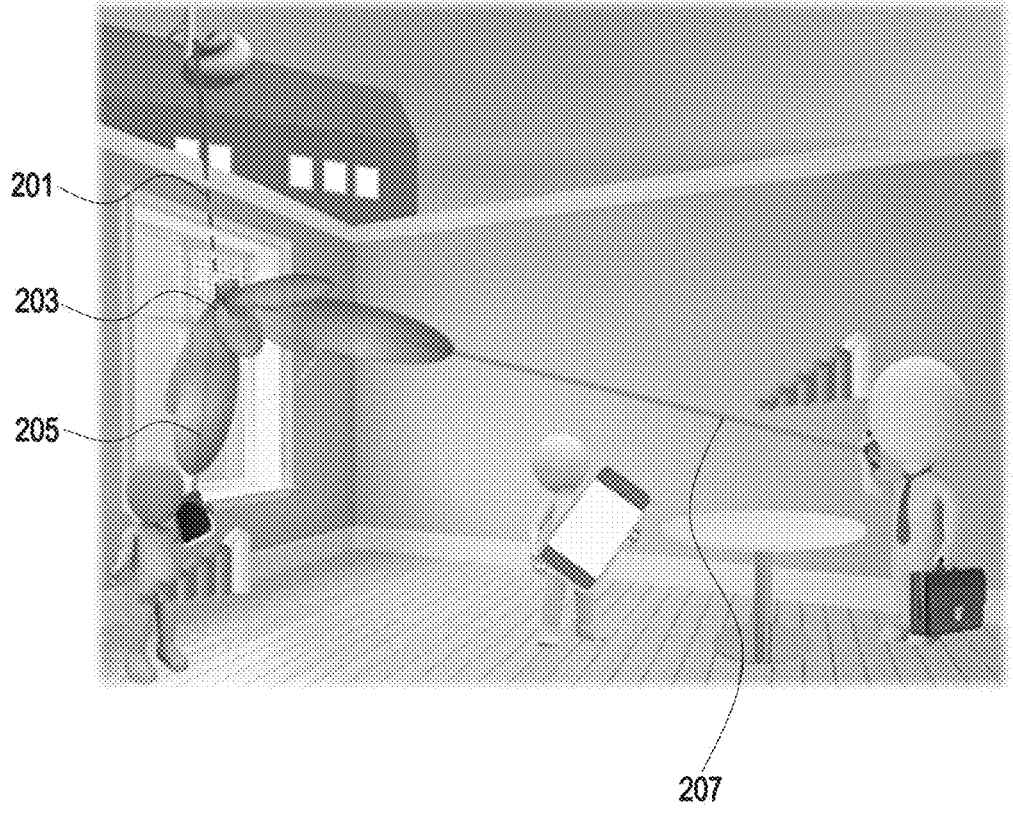
FIGS. 2A and 2B illustrate operations of a transmissive RIS, according to an embodiment.
Figure 2B:
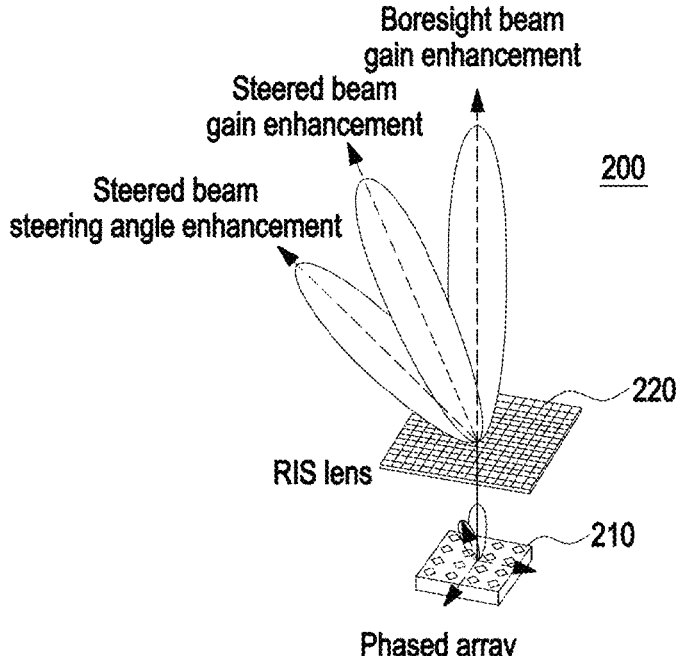

FIGS. 2A and 2B illustrate operations of a transmissive RIS, according to an embodiment.

Referring to FIG. 2A, after the NLOS signal 201 passes through the object 203, the NLOS signal 201 may transfer a first signal 205 to the first reception point and may transfer a second signal 207 to the second reception point.

The object 203 may be implemented as an RIS. The object 203 may transmit electromagnetic waves radiated from the transmission point to enhance the gain for electromagnetic waves and control beam steering.

Referring to FIG. 2B, the RIS 200 may include a phased array 210 and an RIS lens 220. The phased array 210 may or may not include a plurality of RF chains. The RIS lens 220 may provide boresight beam gain enhancement, steered beam gain enhancement, and/or steered beam steering angle enhancement for the signal transmitted through the RIS 200.

When designing an RIS unit cell, the unit cell structure of the RIS may be different depending on whether the RIS is of a reflective type or transmissive type. For example, depending on whether the RIS is of a reflective type or transmissive type, the unit cell structure of the RIS may differ in unit cell pattern, applied current flow, printed circuit board (PCB) stack up structure, and/or switching structure for phase conversion.

Figure 3:
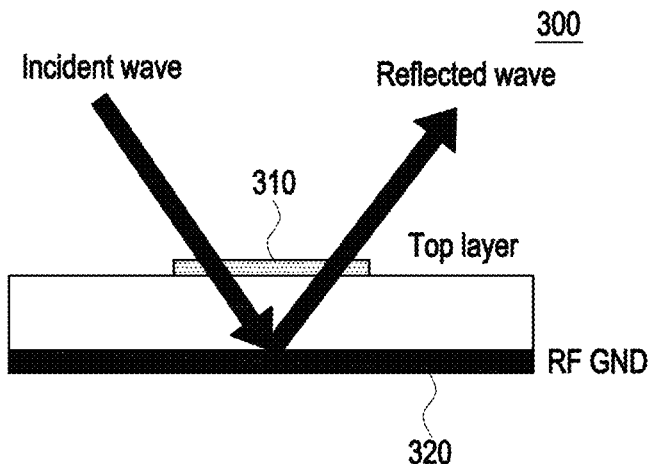
FIG. 3 illustrates operations of a unit cell included in a reflective RIS, according to an embodiment.

FIG. 3 illustrates operations of a unit cell included in a reflective RIS, according to an embodiment.

Referring to FIG. 3, the reflective RIS unit cell 300 may include a metal pattern 310 included in the top layer and a ground layer (RF GND) 320 included in the bottom layer. The metal pattern 310 included in the top layer may generate (or configure) a resonant frequency and a phase change at which the reflective RIS unit cell 300 operates.

The incident wave (e.g., electromagnetic wave) may be incident on the reflective RIS unit cell 300 and may be incident on the ground layer 320 of the bottom layer through the metal pattern 310 of the top layer. The incident wave may be reflected from the ground layer 320 of the bottom layer to become a reflected wave, and the reflected wave may propagate to the outside through the metal pattern 310 of the top layer.

The reflection loss and/or the reflection phase of the reflected wave may be determined according to the metal pattern 310 of the top layer. The reflective RIS unit cell 300 may configure (or include) a switch in the metal pattern 310 of the top layer to adjust the reflection phase by changing the shape and current flow of the pattern.

Figure 4:
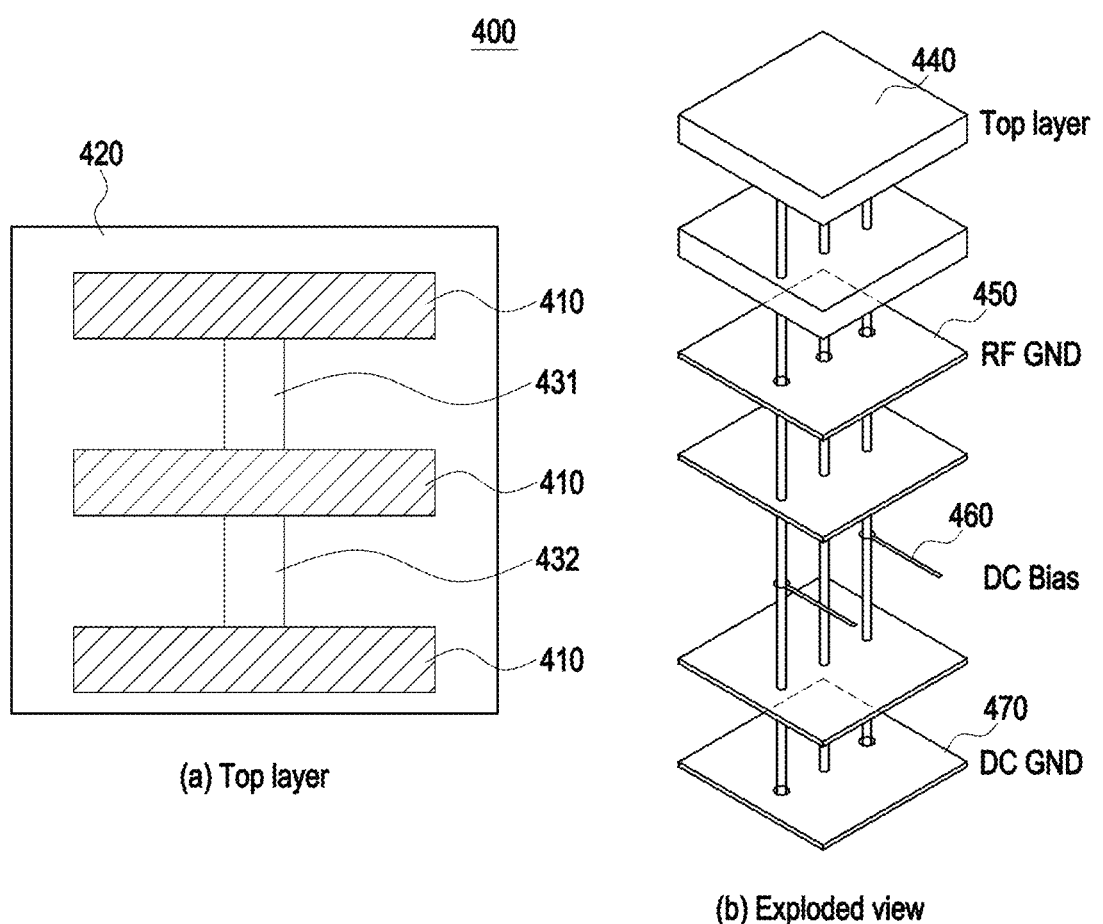
FIG. 4 illustrates an implementation example of a unit cell included in a reflective RIS, according to an embodiment.

FIG. 4 illustrates an implementation example of a unit cell included in a reflective RIS, according to an embodiment.

FIG. 4 (*a*) illustrates a top view of the reflective RIS unit cell 400, and FIG. 4 (*b*) illustrates an exploded view of the reflective RIS unit cell 400.

In FIG. 4 (*a*), the reflective RIS unit cell 400 may include a conductor 410 formed of metal (e.g., copper), a dielectric area 420 in which the conductor is filled-cut, a first PIN diode #1 431, and a second PIN diode #2 432. The first pin diode 431 and the second pin diode 432 may adjust the phase of the reflected wave by changing the flow of current flowing through the copper pattern. A voltage bias line for the operation of the first pin diode 431 and the second pin diode 432 may be implemented using a via hole.

The top layer 440 may include a conductor 410 including a metal pattern, a dielectric area 420, a first pin diode 431, and a second pin diode 432.

In FIG. 4 (*b*), the reflective RIS unit cell 400 may include a top layer 440 including a metal pattern, an RF ground (RF GND) 450, a DC bias 460, and a DC ground (DC GND) 470.

Figure 5:
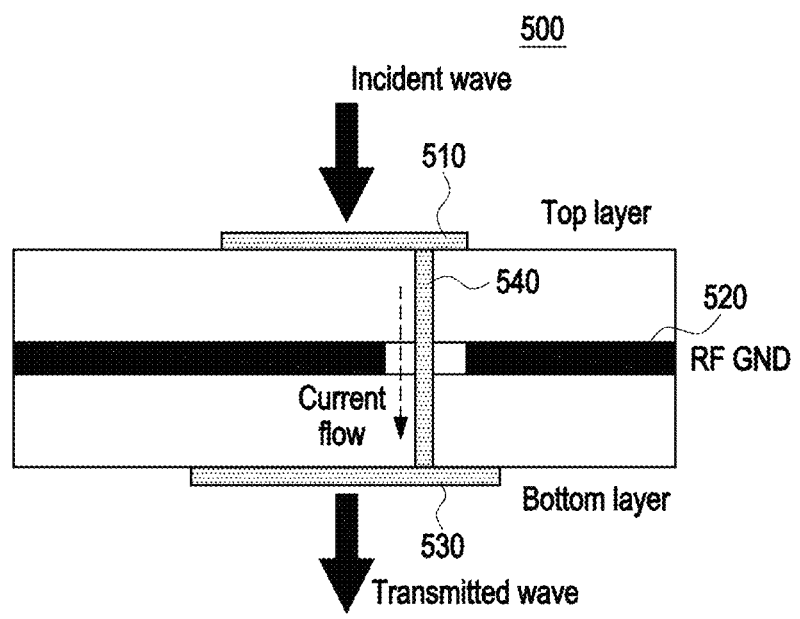
FIG. 5 illustrates operations of a unit cell included in a transmissive RIS, according to an embodiment.

FIG. 5 illustrates operations of a unit cell included in a transmissive RIS, according to an embodiment.

Referring to FIG. 5, the transmissive RIS unit cell 500 may include a top layer including a metal pattern 510 configured to resonate at an operating frequency, a ground layer (RF GND) 520, a bottom layer including a metal pattern 530 configured to resonate at a specific frequency, and a via hole 540 configured to generate a current flow between patterns of the top layer and the bottom layer. The ground layer 520 and a dielectric layer may be formed between the top layer and the bottom layer.

When an incident wave (e.g., an electromagnetic wave) is incident on the metal pattern 510 of the top layer, the electromagnetic field may generate a current by Maxwell's equations, and the generated current may be transferred to the metal pattern 530 of the bottom layer through the via hole 540. The current transferred to the metal pattern 530 of the bottom layer may be converted into electromagnetic waves again by the metal pattern 530 of the bottom layer, and a transmitted wave may be generated. A switch element may be implemented in the metal pattern 510 or 530 included in the top layer or the bottom layer to adjust the transmission loss or transmission phase of the transmitted wave.

Figure 6:
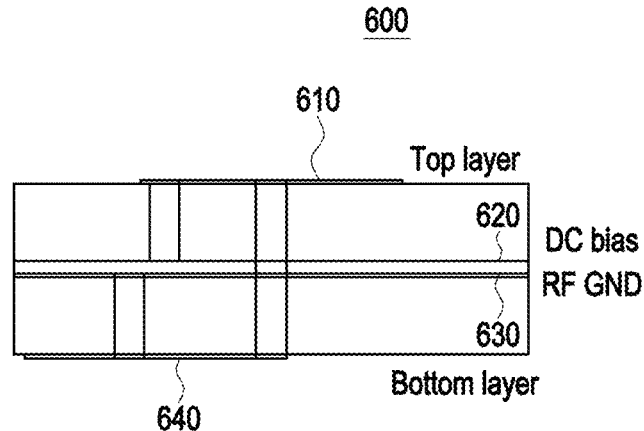
FIG. 6 illustrates an implementation example of a unit cell included in a transmissive RIS, according to an embodiment.

FIG. 6 illustrates an implementation example of a unit cell included in a transmissive RIS, according to an embodiment.

Referring to FIG. 6, the transmissive RIS unit cell 600 may include a top layer including a metal pattern 610 for a resonant frequency, a DC bias 620 for a pin diode operation, an RF ground layer (RF GND) 630, and a bottom layer including a metal pattern 640 for the resonant frequency.

The metal pattern 610 of the top layer and the metal pattern 640 of the bottom layer may be connected through a via hole included in the transmissive RIS unit cell 600. According to an embodiment, two pin diodes may be implemented in the metal pattern 610 of the top layer, and the phase may be adjusted through the two pin diodes when electromagnetic waves are transmitted.

Referring to FIGS. 3 and 5, the reflective RIS and the transmissive RIS may have different structures. In the reflective RIS, electromagnetic waves are not transferred under the ground layer because the incident electromagnetic waves are reflected from the ground layer, whereas in the transmissive RIS, the pattern of the top layer may transfer the current or the field to the pattern of the bottom layer through the via hole.

This disclosure provides an RIS structure capable of dynamically using a transmissive RIS and a reflective RIS in an RIS-based communication system. By applying the RIS structure disclosed herein, it is possible to enhance communication efficiency in various communication environments by providing the functions of a transmissive RIS or reflective RIS through a single RIS structure.

Figure 7:
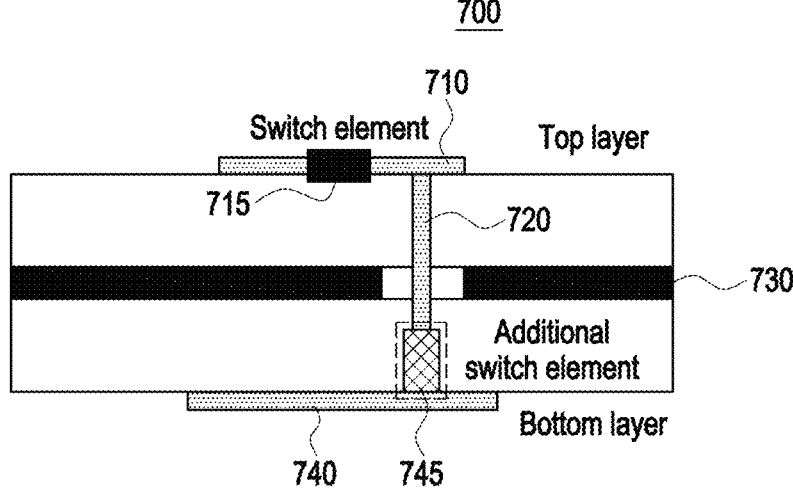
FIG. 7 illustrates an example dynamic mode RIS structure, according to an embodiment.

FIG. 7 illustrates an example dynamic mode RIS structure, according to an embodiment.

Referring to FIG. 7, the dynamic mode RIS unit cell 700 may include a top layer including a metal pattern 710 configured to resonate at an operating frequency, a via hole 720 electrically connecting the metal pattern 710 of the top layer and the metal pattern 740 of the bottom layer, a ground layer 730, and a bottom layer including the metal pattern 740 configured to resonate at the operating frequency. The ground layer 730 and a dielectric layer may be formed between the top layer and the bottom layer.

The metal pattern 710 of the top layer may include a first switch 715 for adjusting the phase of the signal. By changing the on/off state of the first switch 715, the shape of the metal pattern 710 of the top layer may be changed to change the flow of current generated from electromagnetic waves, and accordingly, the phase of the transmitted wave or the reflected wave may be changed. The first switch 715 for phase adjustment may be configured with at least one switch element.

In FIG. 7, for convenience of description, the first switch 715 is illustrated as being included in the metal pattern 710 of the top layer, but the first switch 715 may be implemented as being included in the metal pattern 740 of the bottom layer. When the first switch 715 is implemented to be included in the metal pattern 740 of the bottom layer, the shape of the metal pattern 740 of the bottom layer may be changed by changing the on/off state of the first switch 715 to change the flow of current generated from electromagnetic waves, and accordingly, the phase of the transmitted wave or the reflected wave may be changed.

The dynamic mode RIS including the dynamic mode RIS unit cell 700 may include a second switch 745 therein, and may operate as a transmissive RIS (or in transmissive mode) and/or a reflective RIS (or in reflective mode) according to a change in the on/off state of the second switch 745. According to an embodiment, the metal pattern 710 of the top layer and the metal pattern 740 of the bottom layer may be electrically grounded or shorted according to a change in the on/off state of the second switch 745. The second switch 745 for determining the operation mode of the dynamic mode RIS unit cell 700 may include at least one switch element.

For example, when the second switch 745 is in the on state, the metal pattern 710 of the top layer and the metal pattern 740 of the bottom layer may be electrically grounded, and the dynamic mode RIS unit cell 700 may operate as a transmissive RIS (or in transmissive mode). Alternatively, when the second switch 745 is in the off state, the metal pattern 710 of the top layer and the metal pattern 740 of the bottom layer may be electrically shorted, and the dynamic mode RIS unit cell 700 may operate as a reflective RIS (or in reflective mode).

Figure 8:
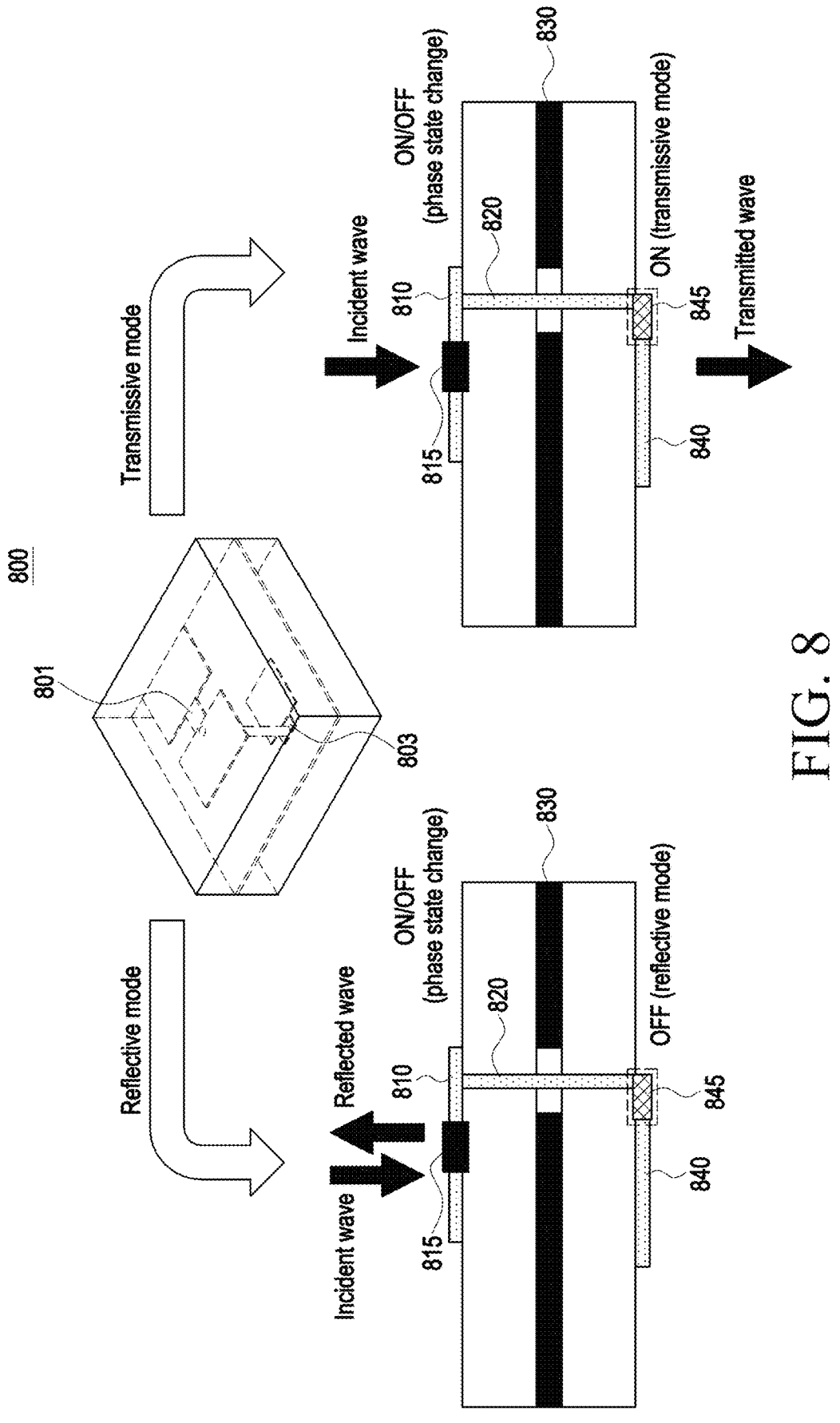
FIG. 8 illustrates an example dynamic mode RIS unit cell, according to an embodiment.

FIG. 8 illustrates an example dynamic mode RIS unit cell, according to an embodiment.

Referring to FIG. 8, the unit cell 800 of the dynamic mode RIS may include a phase state change element 801 (e.g., a diode) and a reflective/transmissive mode change element 803 (e.g., a diode). The phase state change element 801 may be implemented as a phase state change switch 815, and the reflective/transmissive mode change element 803 may be implemented as a reflective/transmissive mode change switch 845.

The unit cell 800 of the dynamic mode RIS may include a metal pattern 810 configured to resonate at an operating frequency, the phase state change switch 815, a via hole 820 electrically connecting the metal pattern 810 of the top layer and the metal pattern 840 of the bottom layer, a ground layer 830, and the reflective/transmissive mode change switch 845.

When the reflective/transmissive mode change switch 845 is in the "OFF" state, the unit cell 800 of the dynamic mode RIS may operate as the reflective RIS, and a reflective wave for the incident wave of the unit cell 800 may be generated.

When the reflective/transmissive mode change switch 845 is in the "ON" state, the unit cell 800 of the dynamic mode RIS may operate as the transmissive RIS, and a transmitted wave for the incident wave of the unit cell 800 may be generated.

Figure 9:
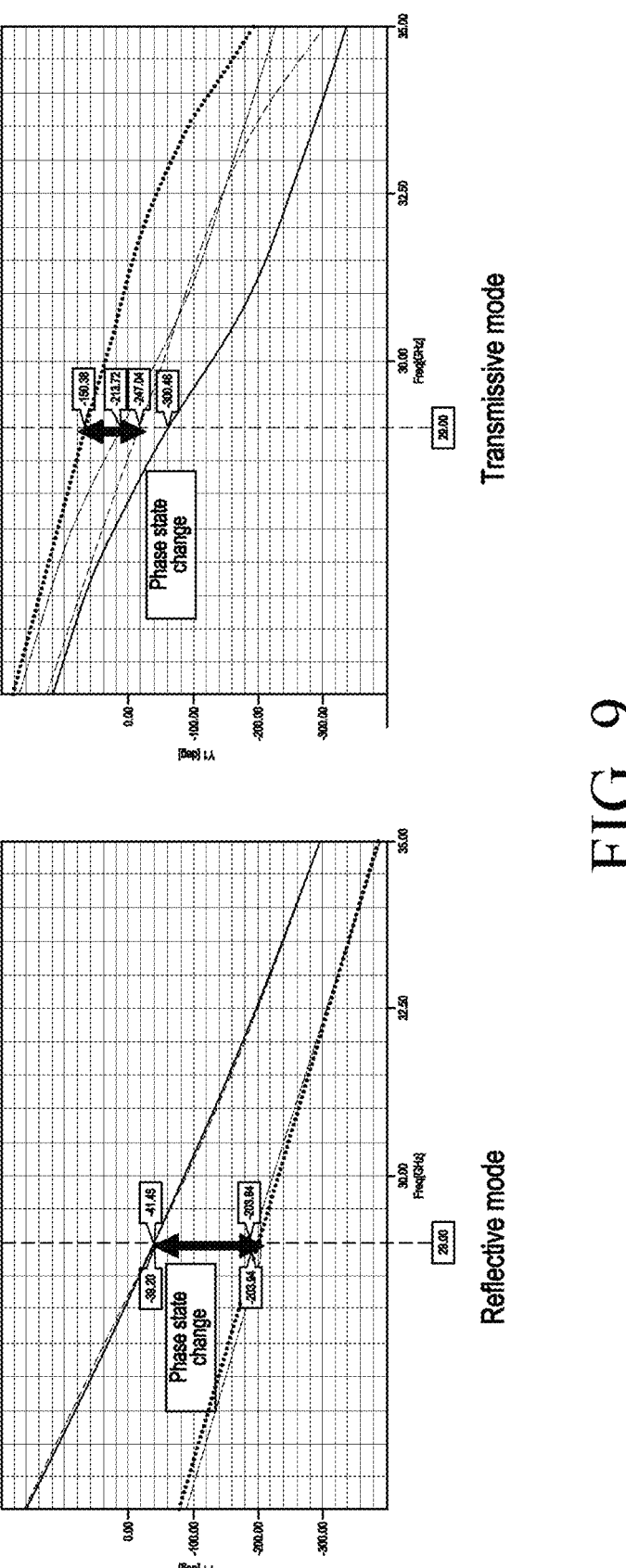
FIG. 9 illustrates reflective phase changes in dynamic mode RIS and transmissive phase changes in dynamic mode RIS, according to an embodiment.

FIG. 9 illustrates a reflection phase change of a dynamic mode RIS, according to an embodiment. Referring to FIGS. 8 and 9, when the dynamic mode RIS operates as the reflective mode (or reflective) RIS, a phase state change at 29 GHz is illustrated.

FIG. 9 also illustrates a transmission phase change of a dynamic mode RIS, according to an embodiment. Referring to FIGS. 8 and 9, when the dynamic mode RIS operates as the transmissive mode (or transmissive) RIS, a phase state change at 29 GHz is illustrated.

FIGS. 10A, 10B, 10C, and 10D illustrate example dynamic mode RIS structures, according to an embodiment.

Figure 10A:
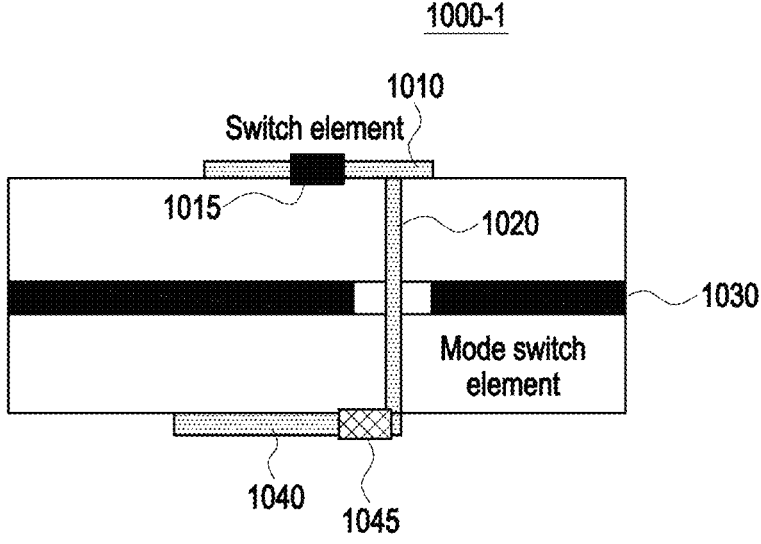
FIGS. 10A, 10B, 10C, and 10D illustrate example dynamic mode RIS structures, according to an embodiment.

Referring to FIG. 10A, the unit cell 1000-1 of the dynamic mode RIS may include a metal pattern 1010 of a top layer configured to resonate at an operating frequency, a first switch 1015 of the top layer for adjusting a phase of a signal, a via hole 1020 electrically connecting the metal pattern 1010 of the top layer and the metal pattern 1040 of the bottom layer, a ground layer 1030, the metal pattern 1040 of the bottom layer configured to resonate at the operating frequency, and a second switch 1045 for determining the operation mode of the unit cell 1000-1. The ground layer 1030 and a dielectric layer may be formed between the top layer and the bottom layer.

By changing the on/off state of the first switch 1015, the shape of the metal pattern 1010 of the top layer may be changed to change the flow of current generated from electromagnetic waves, and accordingly, the phase of the transmitted wave or the reflected wave may be changed. The first switch 1015 for phase adjustment may be configured with at least one switch element.

The unit cell 1000-1 may operate as a transmissive RIS (or in transmissive mode) and/or a reflective RIS (or in reflective mode) according to a change in the on/off state of the second switch 1045. The metal pattern 1010 of the top layer and the metal pattern 1040 of the bottom layer may be electrically grounded or shorted according to a change in the on/off state of the second switch 1045. The second switch 1045 may include at least one switch element.

Figure 10B:
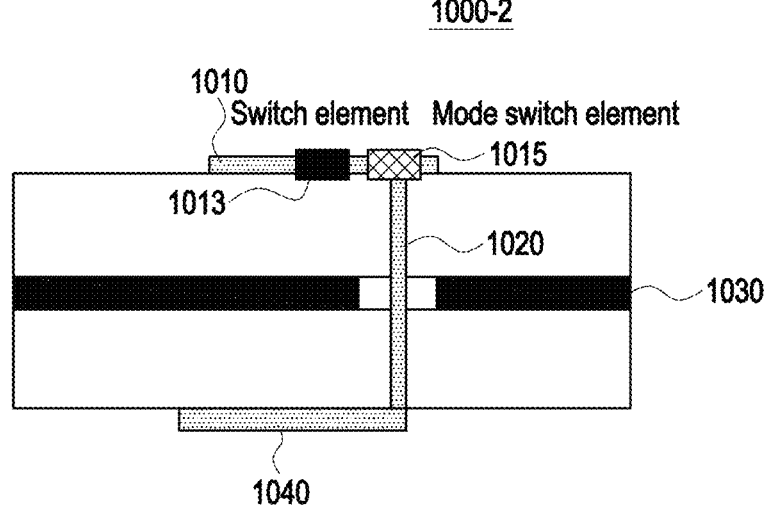

Referring to FIG. 10B, the unit cell 1000-2 of the dynamic mode RIS may include a metal pattern 1010 of a top layer configured to resonate at an operating frequency, a first switch 1013 of the top layer for adjusting a phase of a signal, a second switch 1015 of the top layer for determining an operation mode of the unit cell 1000-2, a via hole 1020 electrically connecting the metal pattern 1010 of the top layer and the metal pattern 1040 of the bottom layer, a ground layer 1030, and the metal pattern 1040 of the bottom layer configured to resonate at the operating frequency. The ground layer 1030 and a dielectric layer may be formed between the top layer and the bottom layer.

By changing the on/off state of the first switch 1013, the shape of the metal pattern 1010 of the top layer may be changed to change the flow of current generated from electromagnetic waves, and accordingly, the phase of the transmitted wave or the reflected wave may be changed. The first switch 1013 for phase adjustment may be configured with at least one switch element.

The second switch 1015 may be directly connected to the via hole 1020. The unit cell 1000-2 may operate as a transmissive RIS (or in transmissive mode) and/or a reflective RIS (or in reflective mode) according to a change in the on/off state of the second switch 1045. The metal pattern 1010 of the top layer and the metal pattern 1040 of the bottom layer may be electrically grounded or shorted according to a change in the on/off state of the second switch 1045. The second switch 1045 may include at least one switch element.

Figure 10C:
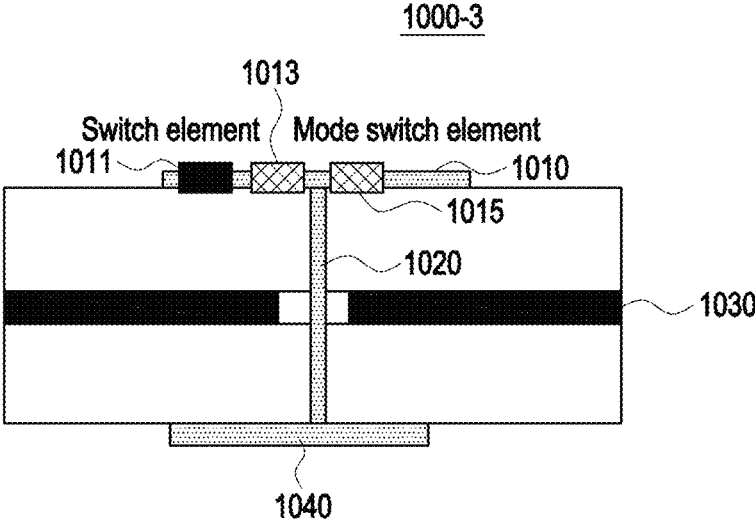

Referring to FIG. 10C, the unit cell 1000-3 of the dynamic mode RIS may include a metal pattern 1010 of a top layer configured to resonate at an operating frequency, a first switch 1011 of the top layer for adjusting a phase of a signal, a second switch 1013 and third switch 1015 of the top layer for determining an operation mode of the unit cell 1000-3, a via hole 1020 electrically connecting the metal pattern 1010 of the top layer and the metal pattern 1040 of the bottom layer, a ground layer 1030, and the metal pattern 1040 of the bottom layer configured to resonate at the operating frequency. The ground layer 1030 and a dielectric layer may be formed between the top layer and the bottom layer.

By changing the on/off state of the first switch 1011, the shape of the metal pattern 1010 of the top layer may be changed to change the flow of current generated from electromagnetic waves, and accordingly, the phase of the transmitted wave or the reflected wave may be changed. The first switch 1011 for phase adjustment may be configured with at least one switch element.

The second switch 1013 and the third switch 1015 may be included in the metal pattern 1010 of the top layer and may be disposed not to be connected to the via hole 1020. The second switch 1013 and the third switch 1015 may be implemented at various positions in the metal pattern 1010 of the top layer depending on the position of the via hole 1020. The unit cell 1000-3 may operate as a transmissive RIS (or in transmissive mode) and/or a reflective RIS (or in reflective mode) according to a change in the on/off state of the second switch 1013 and the third switch 1015. The metal pattern 1010 of the top layer and the metal pattern 1040 of the bottom layer may be electrically grounded or shorted according to a change in the on/off state of the second switch 1013 and the third switch 1015.

FIG. 10C illustrates two switches for determining the operation mode of the unit cell 1000-3 for convenience of description, but three or more switches for determining the operation mode of the unit cell 1000-3 may be provided.

Figure 10D:
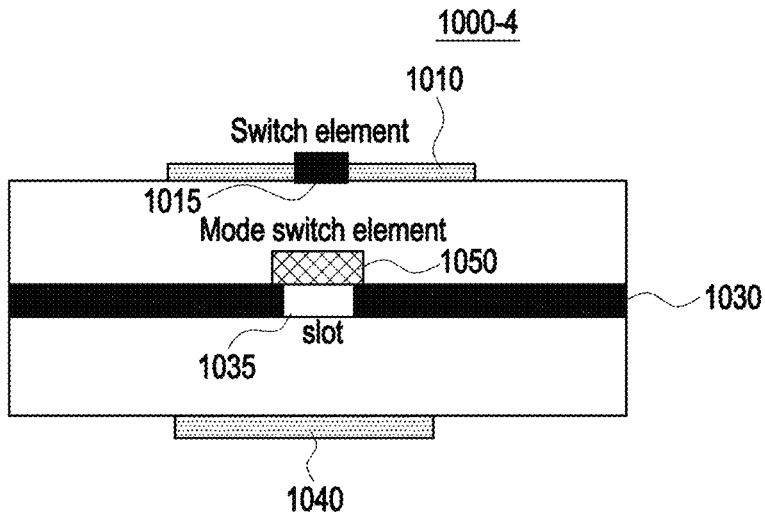

Referring to FIG. 10D, the unit cell 1000-4 of the dynamic mode RIS may include a metal pattern 1010 of a top layer configured to resonate at an operating frequency, a first switch 1015 of the top layer for adjusting a phase of a signal, a ground layer 1030, a slot 1035 in the ground layer 1030, a metal pattern 1040 of a bottom layer configured to resonate at the operating frequency, and a second switch 1050 positioned above the slot 1035 to determine an operation mode of the unit cell 1000-4.

An electromagnetic field may be generated between the metal pattern 1010 of the top layer and the metal pattern 1040 of the bottom layer through the slot 1035 in the ground layer 1030, and a current may be applied thereby. The second switch 1050 may be positioned above the slot 1035 to prevent current from being applied by the electromagnetic field. The shape of the slot 1035 may be deformed as the on/off state of the second switch 1050 is changed.

For example, when the second switch 1050 is in the "OFF" state, a current by an electromagnetic field may be applied between the metal pattern 1010 of the top layer and the metal pattern 1040 of the bottom layer through the slot 1035. Alternatively, when the second switch 1050 is in the "ON" state, a current by an electromagnetic field may not be applied between the metal pattern 1010 of the top layer and the metal pattern 1040 of the bottom layer through the slot 1035.

Figure 11:
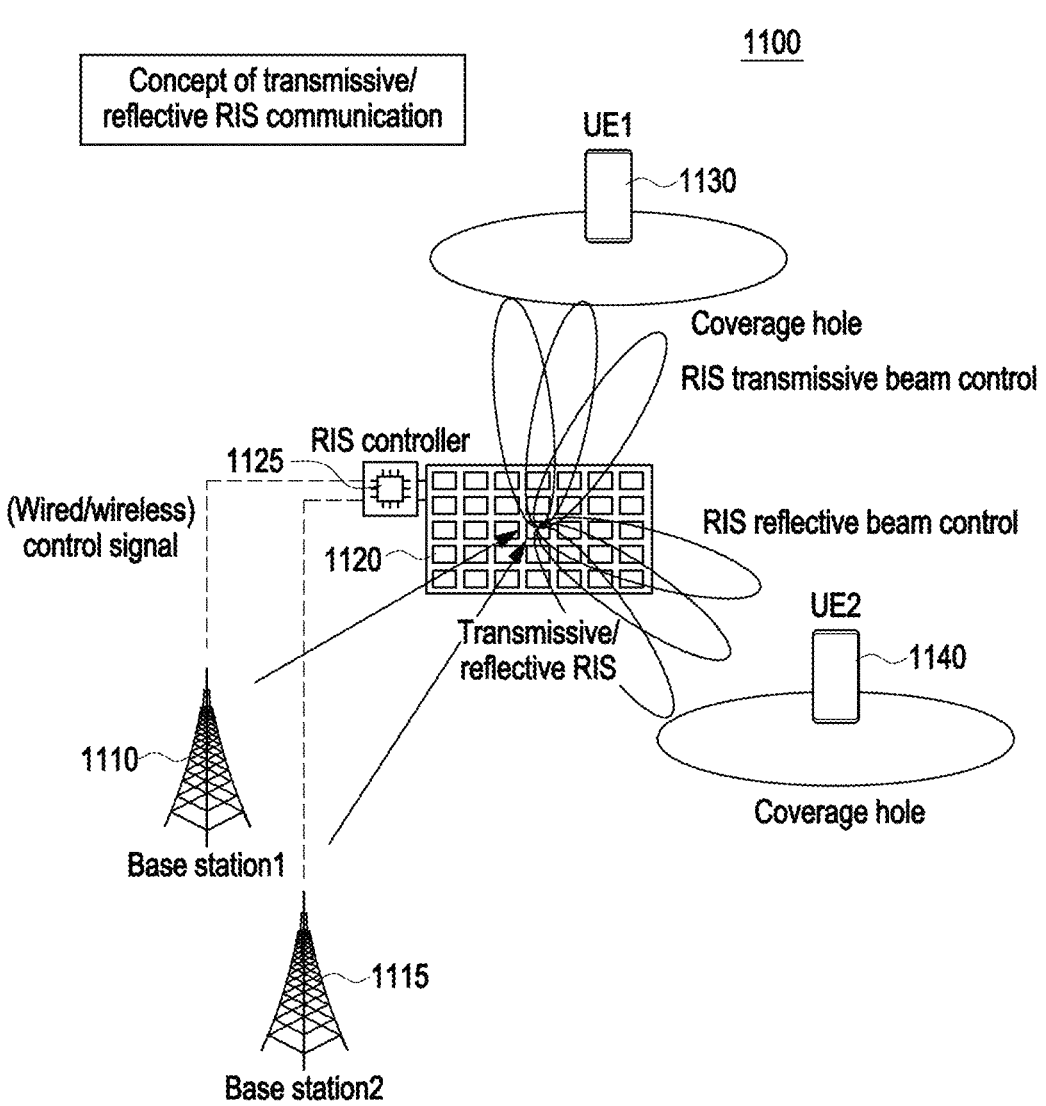
FIG. 11 illustrates a system including a dynamic mode RIS, according to an embodiment.

FIG. 11 illustrates a system including a dynamic mode RIS, according to an embodiment.

Referring to FIG. 11, a system 1100 may include a first base station 1110, a second base station 1115, a dynamic mode RIS 1120 including a plurality of unit cells, an RIS controller 1125 for controlling the dynamic mode RIS 1120, a first UE 1130, and a second UE 1140.

The RIS controller 1125 may be wiredly or wirelessly connected to the first base station 1110 and may receive a control signal for controlling the dynamic mode RIS 1120 from the first base station 1110. The RIS controller 1125 may be wiredly or wirelessly connected to the second base station 1115 and may receive a control signal for controlling the dynamic mode RIS 1120 from the second base station 1115.

The dynamic mode RIS 1120 may include a plurality of unit cells, and an operation mode (e.g., a transmissive RIS (or in transmissive mode) or a reflective RIS (or in reflective mode)) of each of the plurality of unit cells may be independently set. One unit cell itself may operate in only one operation mode at a time. The dynamic mode RIS 1120 having a form in which a plurality of unit cells are arranged in an N×N grid may operate in various operation scenarios. Some of the plurality of unit cells may operate as a transmissive RIS (or in transmissive mode), and others of the plurality of unit cells may operate as a reflective RIS (or in reflective mode).

In order for the first base station 1110 to transmit a signal to the first UE 1130, the first base station 1110 may transmit a first command for the at least one unit cell to the RIS controller 1125 so that at least one unit cell in the dynamic mode RIS 1120 operates as a transmissive RIS (or in transmissive mode). The RIS controller 1125 may control the on/off state of at least one mode change switch included in the dynamic mode RIS 1120 so that the at least one unit cell operates as a transmissive RIS (or in transmissive mode) according to the first command.

The first UE 1130 may transmit an Ack message indicating whether to successfully receive a signal through at least one unit cell operating as a transmissive RIS (or in transmissive mode) according to the first command to the first base station 1110 through the at least one unit cell. The first base station 1110 receiving the Ack message may change all or some of the unit cells operating as the transmissive RIS (or in transmissive mode) if necessary.

In order for the first base station 1110 to transmit a signal to the second UE 1140, the first base station 1110 may transmit a second command for the at least one unit cell to the RIS controller 1125 so that at least one unit cell in the dynamic mode RIS 1120 operates as a reflective RIS (or in reflective mode). The RIS controller 1125 may control the on/off state of at least one mode change switch included in the dynamic mode RIS 1120 so that the at least one unit cell operates as a reflective RIS (or in reflective mode) according to the second command.

The first UE 1130 may transmit an Ack message indicating whether to successfully receive a signal through at least one unit cell operating as a reflective RIS (or in reflective mode) according to the second command to the first base station 1110 through the at least one unit cell. The first base station 1110 receiving the Ack message may change all or some of the unit cells operating as the reflective RIS (or in reflective mode) if necessary.

Figure 12:
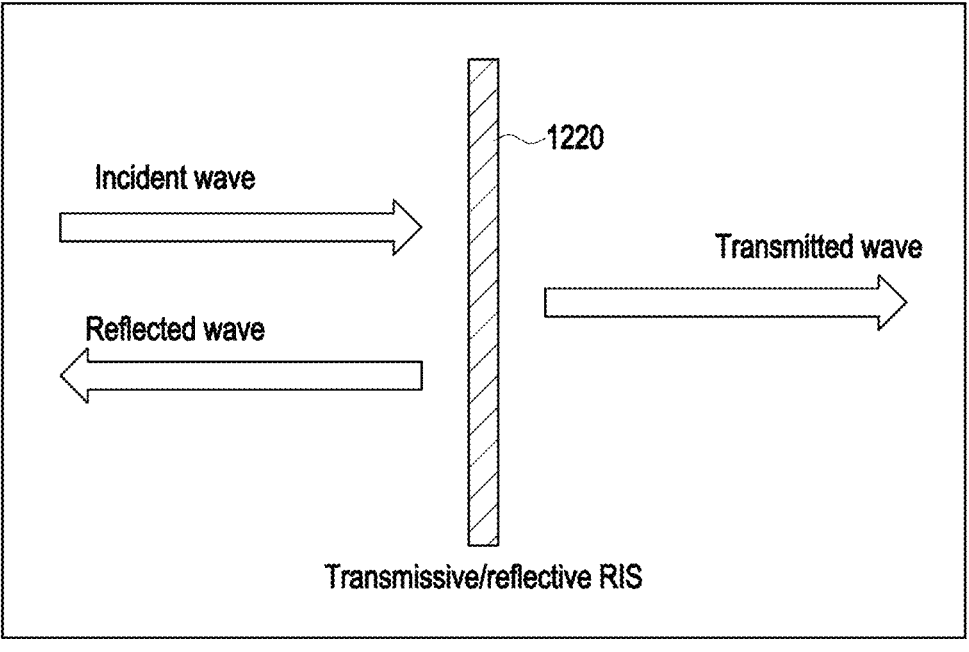
FIG. 12 illustrates operations of a dynamic mode RIS, according to an embodiment.
Figure 12:
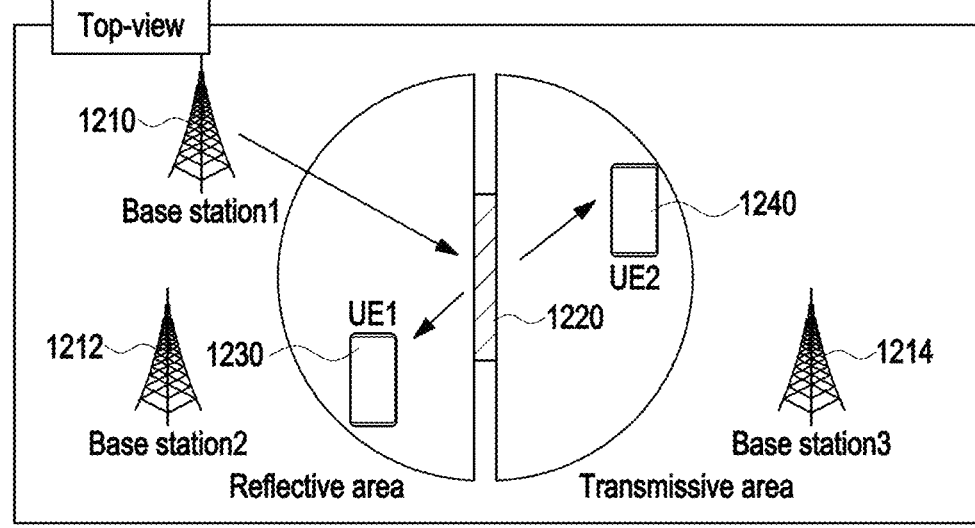

FIG. 12 illustrates operations of a dynamic mode RIS, according to an embodiment.

Referring to FIG. 12, the system may include a first base station 1210, a second base station 1212, a third base station 1214, a dynamic mode RIS 1220 including a plurality of unit cells, a first UE 1230, and a second UE 1240.

At least one of the first base station 1210, the second base station 1212, and the third base station 1214 may determine the operation mode of at least one unit cell in the dynamic mode RIS 1220 according to the current locations of the base station and the UE when transmitting and receiving signals to and from the UE 1230 and/or UE 1240.

The first base station 1210 may determine that the first UE 1230 is positioned in the reflective area, based on the current location of the first base station 1210 and the current location of the first UE 1230. The first base station 1210 may transmit a command message so that at least one unit cell included in the dynamic mode RIS 1220 operates as a reflective RIS (or in reflective mode) in order to transmit and receive a signal to and from the first UE 1230 positioned in the reflective area. When the at least one unit cell operates as a reflective RIS (or in reflective mode) based on the command message, the first base station 1210 may transmit and receive a signal to and from the first UE 1230 in the reflective area through the at least one unit cell.

The first base station 1210 may determine that the second UE 1240 is positioned in the transmissive area, based on the current location of the first base station 1210 and the current location of the second UE 1240. The first base station 1210 may transmit a command message so that at least one unit cell included in the dynamic mode RIS 1220 operates as a transmissive RIS (or in transmissive mode) in order to transmit and receive a signal to and from the second UE 1240 positioned in the transmissive area. When the at least one unit cell operates as a transmissive RIS (or in transmissive mode) based on the command message, the first base station 1210 may transmit and receive a signal to and from the second UE 1240 in the transmissive area through the at least one unit cell.

Figure 13:
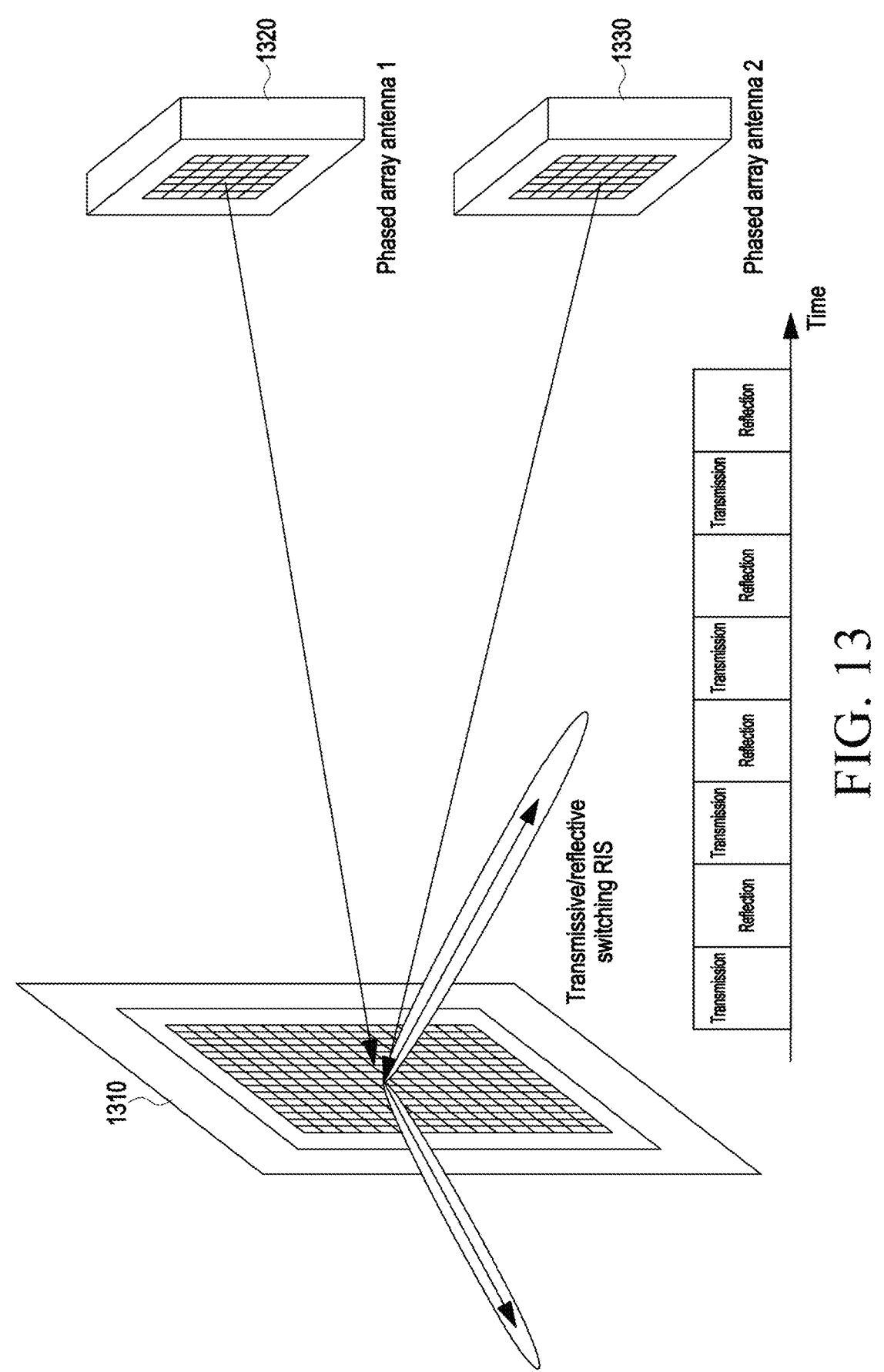
FIG. 13 illustrates an example process in which a dynamic mode RIS is used in a transmissive or reflective type, according to an embodiment.

FIG. 13 illustrates an example process in which a dynamic mode RIS is used in a transmissive or reflective type, according to an embodiment.

Referring to FIG. 13, the dynamic mode RIS 1310 may include a plurality of unit cells, the first phased array antenna 1320 may transmit a first signal to the dynamic mode RIS 1310, and the second phased array antenna 1330 may transmit a second signal to the dynamic mode RIS 1310. The first phased array antenna 1320 may be included in the base station or the UE and may be used to transmit and receive signals. In addition, the second phased array antenna 1330 may be included in the base station or the UE and may be used to transmit and receive signals.

The dynamic mode RIS 1310 may operate as the reflective RIS (or in reflective mode) for the signal received from the first phased array antenna 1320, and may operate as the transmissive RIS (or in transmissive mode) for the signal received from the second phased array antenna 1330. The dynamic mode RIS 1310 may be configured to vary the operation mode each preset unit time. The unit time may be set by the base station, and the RIS controller controlling the dynamic mode RIS 1310 may receive information about the unit time from the base station.

The dynamic mode RIS 1310 may transmit a signal received from the second phased array antenna 1330 for a first unit time and reflect a signal received from the first phased array antenna 1320 for a second unit time after the first unit time. The dynamic mode RIS 1310 may sequentially reflect or transmit the signals received from the first phased array antenna 1320 and the second phased array antenna 1330.

Figure 14:
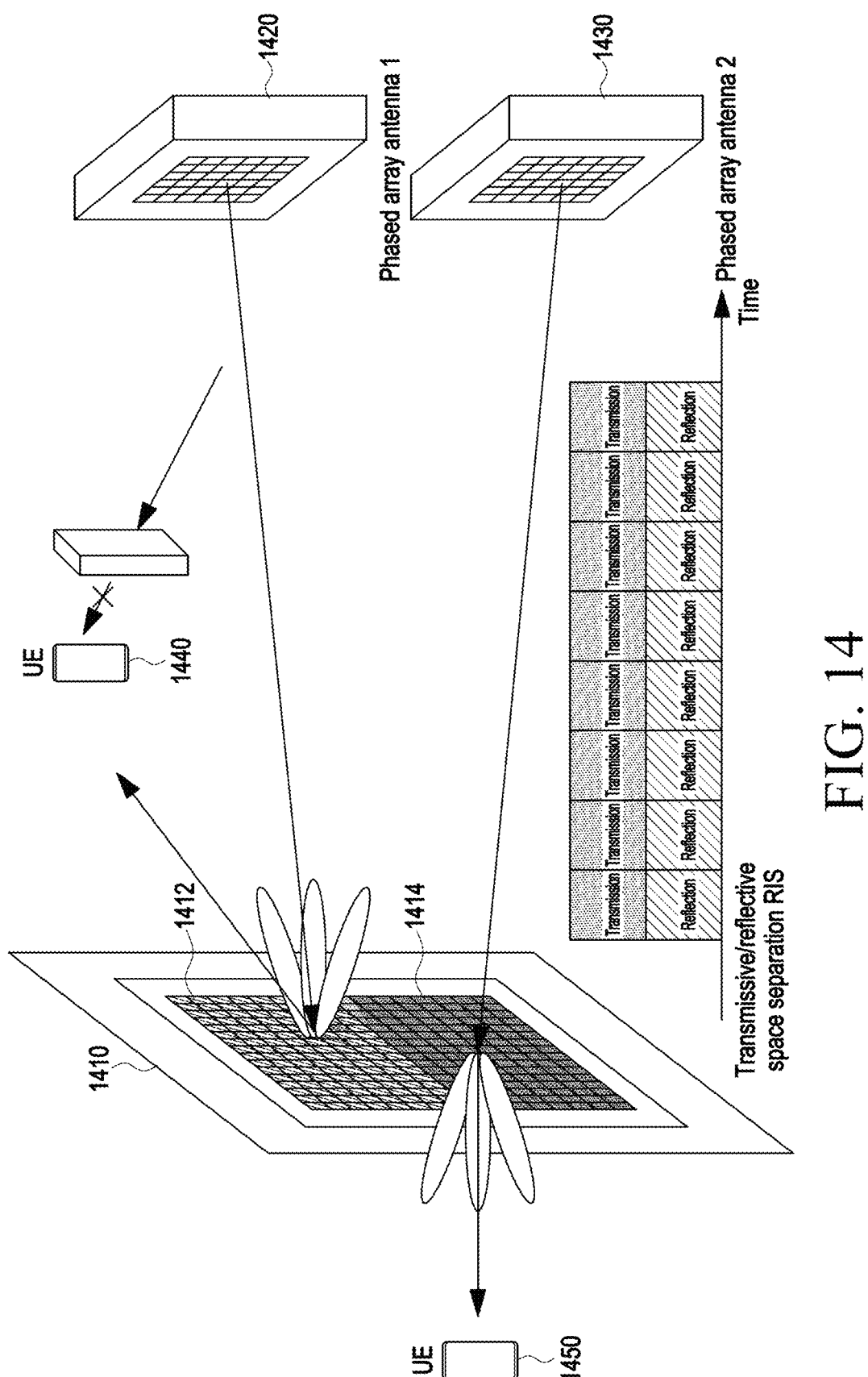
FIG. 14 illustrates another example process in which a dynamic mode RIS is used in a transmissive or reflective type, according to an embodiment.

FIG. 14 illustrates another example process in which a dynamic mode RIS is used in a transmissive or reflective type, according to an embodiment.

Referring to FIG. 14, the dynamic mode RIS 1410 may include a plurality of unit cells 1412 and 1414, the first phased array antenna 1420 may transmit a first signal for transmission to the first UE 1440 to the dynamic mode RIS 1410, and the second phased array antenna 1430 may transmit a second signal for transmission to the second UE 1450 to the dynamic mode RIS 1410. The first phased array antenna 1420 may be included in the base station and used to transmit and receive signals. In addition, the second phased array antenna 1430 may be included in the base station and used to transmit and receive signals.

The dynamic mode RIS 1410 may use the plurality of unit cells with the unit cells spatially separated. The dynamic mode RIS 1410 may include first unit cells 1412 operating as a reflective RIS (or in reflective mode) and second unit cells 1414 operating as a transmissive RIS (or in transmissive mode). The configuration of the first unit cells 1412 operating as the reflective RIS (or in reflective mode) and the second unit cells 1414 operating as the transmissive RIS (or in transmissive mode) may be made by the base station, and the RIS controller controlling the dynamic mode RIS 1410 may receive information about the configuration from the base station.

The dynamic mode RIS 1410 may reflect the first signal transmitted from the first phased array antenna 1420 through the first unit cells 1412 operating as the reflective RIS (or in reflective mode), and the reflected first signal may be received by the first UE 1440.

In addition, the dynamic mode RIS 1410 may transmit the second signal transmitted from the second phased array antenna 1430 through the second unit cells 1414 operating as the transmissive RIS (or in transmissive mode), and the transmitted second signal may be received by the second UE 1450.

The dynamic mode RIS 1410 may reflect the first signal transmitted from the first phased array antenna 1420 through the first unit cells 1412 for the first unit time, and may transmit the second signal transmitted from the second phased array antenna 1430 through the second unit cells 1414. The dynamic mode RIS 1410 may reflect the first signal transmitted from the first phased array antenna 1420 through the first unit cells 1412 for the second unit time after the first unit time, and may transmit the second signal transmitted from the second phased array antenna 1430 through the second unit cells 1414.

Figure 15:
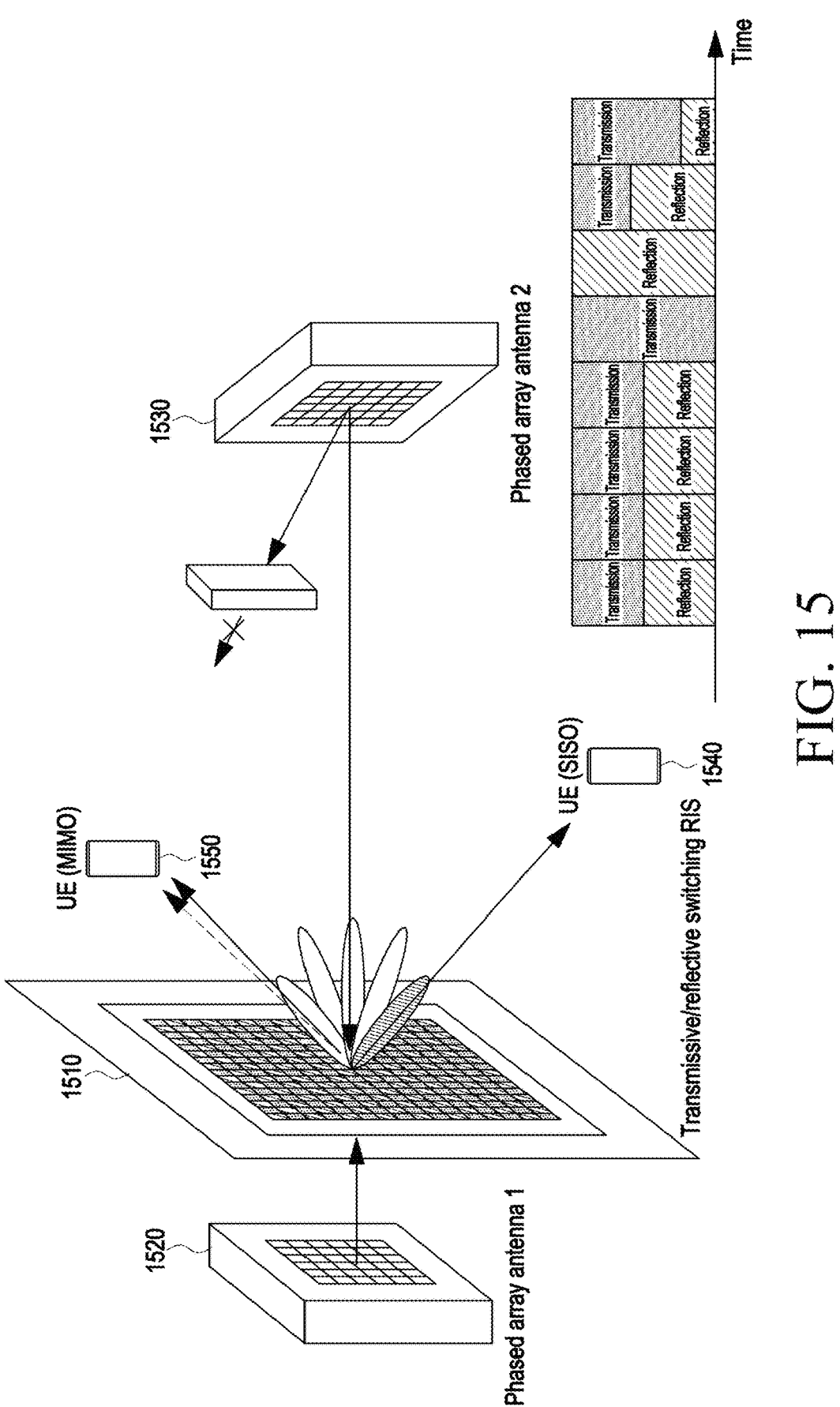
FIG. 15 illustrates another example process in which a dynamic mode RIS is used in a transmissive or reflective type, according to an embodiment.

FIG. 15 illustrates another example process in which a dynamic mode RIS is used in a transmissive or reflective type, according to an embodiment.

Referring to FIG. 15, the dynamic mode RIS 1510 may include a plurality of unit cells, the first phased array antenna 1520 may transmit a first signal for transmission to the first UE 1540 to the dynamic mode RIS 1510, and the second phased array antenna 1530 may transmit a second signal for transmission to the second UE 1550 to the dynamic mode RIS 1510. For example, when the first phased array antenna 1520 is located inside a specific area (e.g., a building) and the second phased array antenna 1530 is located outside the specific area (e.g., a building), various functions, such as signal strength enhancement, transmission gain enhancement, and/or beam steering in coverage, may be performed simultaneously. An effect of enhancing multiple-input and multiple-output (MIMO) channels may also be provided by adjusting signals from the first phased array antenna 1520 and the second phased array antenna 1530.

The first phased array antenna 1520 may be included in the base station and used to transmit and receive signals. The second phased array antenna 1530 may also be included in the base station and used to transmit and receive signals.

The dynamic mode RIS 1510 may use the plurality of unit cells with the unit cells spatially separated. The dynamic mode RIS 1510 may include first unit cells operating as a transmissive RIS (or in transmissive mode) and second unit cells operating as a reflective RIS (or in reflective mode). The configuration for the first unit cells operating as the transmissive RIS (or in transmissive mode) and the second unit cells operating as the reflective RIS (or in reflective mode) may be made by the base station, and the RIS controller controlling the dynamic mode RIS 1510 may receive information about the configuration from the base station.

The dynamic mode RIS 1510 may transmit the first signal transmitted from the first phased array antenna 1520 through first unit cells operating as the transmissive RIS (or in transmissive mode), and the transmitted first signal may be received by the first UE 1540.

The dynamic mode RIS 1510 may transmit the first signal transmitted from the first phased array antenna 1520 through first unit cells operating as the transmissive RIS (or in transmissive mode), and the transmitted first signal may be received by the second UE 1550. The dynamic mode RIS 1510 may reflect the second signal transmitted from the second phased array antenna 1530 through the second unit cells operating as the reflective RIS (or in reflective mode), and the reflected second signal may be received by the second UE 1550. The second UE 1550 may receive both the transmitted first signal and the reflected second signal.

Figure 16:
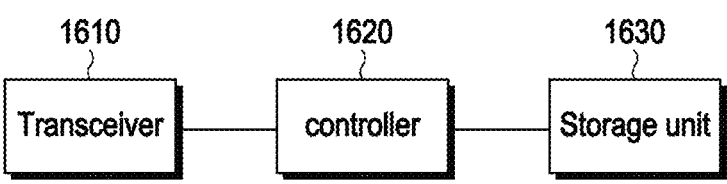
FIG. 16 illustrates a structure of a base station, according to an embodiment.

FIG. 16 illustrates a structure of a base station, according to an embodiment.

The base station in FIG. 16 may be any one of the above-described base stations in FIGS. 1A to 15. Referring to FIG. 16, the base station may include a transceiver 1610, a controller 1620, and a storage unit 1630. In the disclosure, the controller may be defined as a circuit, an ASIC, or at least one processor.

The transceiver 1610 may transmit and receive signals to and from other entities, and may also be referred to as a transmission/reception unit.

The controller 1620 may control the overall operation of the base station according to an embodiment disclosed herein and may also be referred to as a processor. For example, the controller 1620 may control inter-block signal flow to perform the operations according to the above-described flowchart. Specifically, the controller 1620 may control the operations of the base station described above with reference to FIGS. 1 to 15.

The storage unit 1630 may store at least one of information transmitted/received via the transceiver 1610 and information generated via the controller 1620. For example, the storage unit 1630 may store information and data necessary for the method described above with reference to FIGS. 1A to 15.

Figure 17:
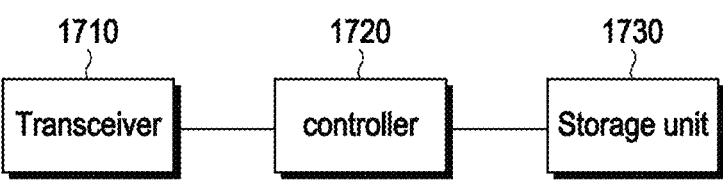
FIG. 17 illustrates a structure of an RIS controller, according to an embodiment.

FIG. 17 illustrates a structure of an RIS controller, according to an embodiment.

The RIS controller of FIG. 17 may be the RIS controller 1125 of FIG. 11 and may be a device for controlling the RIS described above in connection with FIGS. 1A to 15. Referring to FIG. 17, the RIS controller may include a transceiver 1710, a controller 1720, and a storage unit 1730. In the disclosure, the controller 1720 may be defined as a circuit, an ASIC, or at least one processor.

The transceiver 1710 may transmit and receive signals to and from other entities, and may also be referred to as a transmission/reception unit.

The controller 1720 may control the overall operation of the RIS controller according to an embodiment disclosed herein and may also be referred to as a processor. For example, the controller 1720 may control inter-block signal flow to perform the operations according to the above-described flowchart. Specifically, the controller 1720 may control the operations of the RIS controller described above with reference to FIGS. 1A to 15.

The storage unit 1730 may store at least one of information transmitted/received via the transceiver 1710 and information generated via the controller 1720. For example, the storage unit 1730 may store information and data necessary for the method described above with reference to FIGS. 1A to 15.

Figure 18:
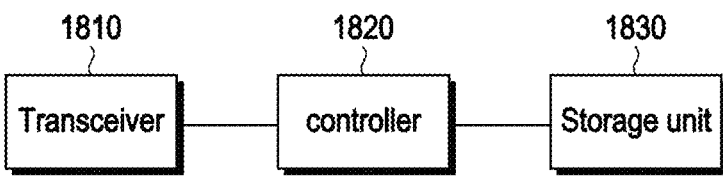
FIG. 18 illustrates a structure of a UE, according to an embodiment.

FIG. 18 illustrates a structure of a UE, according to an embodiment.

The UE of FIG. 18 may be any one of the UEs described above in connection with FIGS. 1A to 15. Referring to FIG. 18, the UE may include a transceiver 1810, a controller 1820, and a storage unit 1830. In the disclosure, the controller 1820 may be defined as a circuit, an ASIC, or at least one processor.

The transceiver 1810 may transmit and receive signals to and from other entities, and may also be referred to as a transmission/reception unit.

The controller 1820 may control the overall operation of the UE according to an embodiment disclosed herein and may also be referred to as a processor. For example, the controller 1820 may control inter-block signal flow to perform the operations according to the above-described flowchart. Specifically, the controller 1820 may control the operations of the UE described above with reference to FIGS. 1A to 15.

The storage unit 1830 may store at least one of information transmitted/received via the transceiver 1810 and information generated via the controller 1820. For example, the storage unit 1830 may store information and data necessary for the method described above with reference to FIGS. 1A to 15.

The methods according to the embodiments described in the specification or claims of this disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories (RAMs), non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Alternatively, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific disclosed embodiments. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A reconfigurable intelligent surface (RIS) including a plurality of unit cells in a wireless communication system, the RIS comprising:

a first pattern included in a top layer of a unit cell included in the RIS;

a second pattern included in a bottom layer of the unit cell included in the RIS; and at least one switch configured to electrically ground or short the first pattern and the second pattern in response to a command for determining whether the unit cell included in the RIS operates as a transmissive RIS or a reflective RIS.

2. The RIS of claim 1, wherein when the command indicates that the unit cell included in the RIS operates as the transmissive RIS, the at least one switch is changed to an ON state to electrically ground the first pattern and the second pattern.

3. The RIS of claim 1, wherein when the command indicates that the unit cell included in the RIS operates as the reflective RIS, the at least one switch is changed to an OFF state to short the first pattern and the second pattern.

4. The RIS of claim 1, wherein the at least one switch is included in the first pattern of the unit cell.

5. The RIS of claim 1, wherein the at least one switch is included in the second pattern of the unit cell.

6. The RIS of claim 1, wherein the at least one switch is implemented on a slot included in a ground layer of the unit cell.

7. The RIS of claim 1, further comprising a switch for adjusting a phase of a transmitted wave or a reflected wave for the RIS.

8. The RIS of claim 7, wherein the switch for adjusting the phase of the transmitted wave or the reflected wave for the RIS is included in the first pattern or the second pattern of the unit cell.

9. The RIS of claim 1, further comprising a via hole connected to the at least one switch to electrically connect the first pattern and the second pattern.

10. The RIS of claim 1, further comprising:
an RIS controller,
wherein the command for determining whether the unit cell included in the RIS operates as the transmissive RIS or the reflective RIS is received from the RIS controller.

11. The RIS of claim 1, wherein the at least one switch is controlled so that first cells among the plurality of unit cells included in the RIS operate as the transmissive RIS, and the at least one switch is controlled so that second cells among the plurality of unit cells included in the RIS operate as the reflective RIS.

12. The RIS of claim 1, wherein the at least one switch is controlled so that at least one cell among the plurality of unit cells included in the RIS operate as the transmissive RIS for a first unit time, and
wherein the at least one switch is controlled so that the at least one cell among the plurality of unit cells included in the RIS operate as the reflective RIS for a second unit time after the first unit time.

13. A reconfigurable intelligent surface (RIS) controller controlling an RIS including a plurality of unit cells in a wireless communication system, the RIS controller comprising:
a transceiver; and
a controller coupled with the transceiver and configured to:
receive, from a base station, a message for determining whether a unit cell included in the RIS operates as a transmissive RIS or a reflective RIS, and
transmit, to the RIS, a command for controlling at least one switch included in the RIS to electrically ground or short a first pattern included in the RIS and a second pattern included in the RIS based on the message.

14. The RIS controller of claim 13, wherein the command instructs the at least one switch to turn ON to electrically ground the first pattern and the second pattern so that the unit cell included in the RIS operates as the transmissive RIS.

15. The RIS controller of claim 13, wherein the command instructs the at least one switch to turn OFF to short the first pattern and the second pattern so that the unit cell included in the RIS operates as the reflective RIS.

16. The RIS controller of claim 13, wherein the controller is further configured to:
transmit a first message for controlling the at least one switch to the RIS so that first cells among the plurality of unit cells included in the RIS operate as the transmissive RIS; and
transmit a second message for controlling the at least one switch to the RIS so that second cells among the plurality of unit cells included in the RIS operate as the reflective RIS.

17. The RIS controller of claim 13, wherein the controller is further configured to:
transmit a third message for controlling the at least one switch to the RIS so that at least one cell among the plurality of unit cells included in the RIS operate as the transmissive RIS for a first unit time; and
transmit a fourth message for controlling the at least one switch to the RIS so that the at least one cell among the plurality of unit cells included in the RIS operate as the reflective RIS for a second unit time after the first unit time.

* * * * *